United States Patent [19]

Chapman et al.

[11] 3,855,242

[45] Dec. 17, 1974

[54] BENZO[B]THIENYL-ALKYL-GUANIDINES

[75] Inventors: Norman Bellamy Chapman; Kenneth Clarke, both of East Yorkshire; John William James, Buckinghamshire, all of England

[73] Assignee: Aspro-Nicholas Limited, Slough, Berkshire, England; by said James

[22] Filed: Oct. 26, 1971

[21] Appl. No.: 192,320

Related U.S. Application Data

[63] Continuation-in-part of Ser. Nos. 157,775, June 28, 1971, abandoned, and Ser. No. 144,334, May 17, 1971, abandoned, and Ser. No. 782,003, Dec. 6, 1968, abandoned.

[52] U.S. Cl....... 260/330.5, 260/247.1, 260/293.57, 260/326.28, 260/326.34, 260/326.55 A, 260/326.84, 424/248, 424/267, 424/274, 424/275
[51] Int. Cl. .................. A61k 27/00, C07d 63/22
[58] Field of Search .................. 260/330.5

[56] References Cited
UNITED STATES PATENTS
3,070,606 12/1962 Anderson.......................... 260/330.5

3,518,278  6/1970  Suh.................................. 260/294.8
3,651,068  3/1972  Suh.................................. 260/294.8
3,704,237  11/1972  Suh................................. 260/294.8

OTHER PUBLICATIONS

Lewis et al., J. Med. Chem., Vol. 6, No. 6 (Nov. 1963), p. 711–716.

Primary Examiner—Henry R. Jiles
Assistant Examiner—C. M. S. Jaisle

[57] ABSTRACT

Pharmacologically active benzo[b]thiophen derivatives (hereinafter referred to as benzthiophen derivatives), processes for their preparation, pharmaceutical formulations of said derivatives, and methods of treatment involving the use of said derivatives, are provided. The benzo[b]thiophen derivatives have the formula

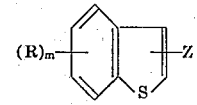

8 Claims, No Drawings

BENZO[B]THIENYL-ALKYL-GUANIDINES

This Application is a continuation-in-part of Ser. No. 157,775, filed June 28, 1971, Ser. No. 144,334, filed May 17, 1971 and Ser. No. 782,003, filed Dec. 6, 1968, all now abandoned.

This invention relates to pharmacologically active benzo[b]thiophen derivatives (hereinafter referred to as benzthiophen derivatives) and to processes for their preparation. The invention provides also pharmaceutical formulations of said derivatives and methods of treatment involving the use of said derivatives.

According to the instant invention, there are provided benzo[b]thiophen of the formula

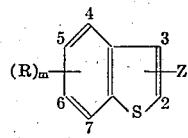

wherein Z is selected from the class consisting of:

a. monovalent groups of formula $-(B)n-Y$     (1)
wherein $n$ is selected from 0 and 1, B is an alkylene chain of 1 to 4 carbon atoms attached to a position selected from the 2, 3 and 5 positions of the benzothienyl nucleus, and Y is selected from the class consisting of groups of the formulae:

i. $-NR_5CO.NH_2$     (IIi)

wherein $R_5$ is selected from the group consisting of hydrogen and alkyl of one to six carbon atoms, ii. $-NH.C(:NX_1).NX_2X_3$     (IIii)

wherein $X_1$ is selected from the group consisting of hydrogen and alkyl of one to six carbon atoms, $X_2$ is selected from the group consisting of hydrogen, alkyl of one to six carbon atoms and $X_3$ is selected from the group consisting of hydrogen, alkyl of one to six carbon atoms, phenyl and the group $-C(:NH).NH_2$ iii. $-C(:NH).OR_1$     (IIiii)

wherein $R_1$ is alkyl of one to six carbon atoms, iv. $-C(:NH).NH_2$     (IIiv)

v. $-C(:NOR_2).NH_2$     IIV wherein $R_2$ is selected from the class consisting of hydrogen and alkyl of one to six carbon atoms b. monovalent groups of the formula $-CHR_7.R_8$     (IIvi)

wherein $R_7$ is selected from the class consisting of hydrogen and methyl, $R_8$ is selected from the class consisting of amino, monoalkylamino, dialkylamino, pyrrolidino, piperidino and morpholine, and the group is attached to the benzothienyl ring at a position selected from the 2, 3 and 5 positions.

c. divalent groups of the formula $-CH_2.NR_9.CH_2-$ attached to the 2 and 3 positions of the benzothienyl nucleus to form a 2,3-dihydrobenzo[b]-thieno[2,3-c]pyrrole nucleus and wherein $R_9$ is selected from the class consisting of alkyl of one to six carbon atoms, cycloalkyl of three to six carbon atoms, hydroxyalkyl of one to six carbon atoms, halogenoalkyl of one to six carbon atoms and benzyl, and d. divalent groups of the formula

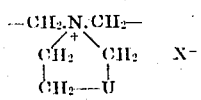

attached to the 2 and 3 positions of the benzothienyl nucleus to form a 2,3-dihydro-benzo[b]thieno[2,3-c]pyrrole nucleus and wherein U is selected from the group consisting of $-CH_2-$, $-CH_2.CH_2-$ and $-OCH_2-$ and $X^-$ is an anion and wherein $m$ is selected from 0,1 and 2 and R is a monovalent substituent selected from the class consisting of halogen, alkoxy of one to six carbon atoms, alkyl of one to six carbon atoms, alkoxycarbonyl of two to seven carbon atoms, and nitro. provided that when $n$ is,1, B is 3-methylene and Y is $-C(:NH).OC_2H_5$, $m$ is an integer and at least one R substituent is other than 2-methyl, when Z is $-CH_2NR_9CH_2-$ and $R_9$ is cyclohexyl, $m$ is an integer.

when Z is

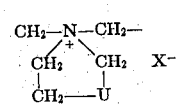

and U is selected from $-CH_2CH_2-$ and $-CH_2O-$, $m$ is an integer, when Z is $-CH_2R_8$ and is attached to a position selected from the 2 and 3 positions, $m$ is an integer The instant invention provides also pharmaceutical compositions comprising in association with a pharmaceutically acceptable carrier therefor a therapeutically effective amount of a benzo[b]thiophen of the formula

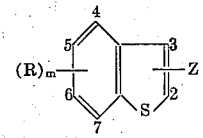

wherein Z is selected from the class consisting of:

a. monovalent groups of the formula $-(B)n-Y$     (1)
wherein $n$ is selected from 0 and 1, B is an alkylene chain of one to four carbon atoms attached to a position selected from the 2, 3 and 5 positions of the benzothienyl nucleus, and Y is selected from the class consisting of groups of the formulae:

i. $-NR_5CO.NH_2$     (IIi)

wherein $R_5$ is selected from the group consisting of hydrogen and alkyl of one to six carbon atoms, ii. $-NH.C(:NX_1).NX_2X_3$     (IIii)

wherein $X_1$ is selected from the group consisting of hydrogen and alkyl of one to six carbon atoms, $X_2$ is selected from the group consisting of hydrogen, alkyl of one to six carbon atoms and $X_3$ is selected from the group consisting of hydrogen, alkyl of one to six carbon atoms, phenyl and the group $-C(:NH).NH_2$ iii. $-C(:NH).OR_1$     (IIiii)

wherein $R_1$ is alkyl of one to six carbon atoms, iv. $-C(:NH).NH_2$     (IIiv)

v. $-C(:NOR_2).NH_2$     (IIv)

wherein $R_2$ is selected from the class consisting of hydrogen and alkyl of one to six carbon atoms b. monovalent groups of the formula $-CHR_7.R_8$     (IIvi)

wherein $R_1$ is selected from the class consisting of hydrogen and methyl, $R_8$ is selected from the class consisting of amino, monoalkylamino, dialkylamino, pyrrolidino, piperidino and morpholino, and the group is attached to the benzothienyl ring at a position selected from the 2,3 and 5 positions.

c. divalent groups of the formula —$CH_2.NR_9.CH_2$— attached to the 2 and 3 positions of the benzothienyl nucleus to form a 2,3-dihydrobenzo[b]thieno[2,3-c]pyrrole nucleus and wherein $R_9$ is selected from the class consisting of alkyl of one to six carbon atoms, cycloalkyl of three to six carbon atoms, hydroxyalkyl of one to six carbon atoms, halogenoalkyl of one to six carbon atoms and benzyl, and d. divalent groups of the formula

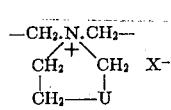

attached to the 2 and 3 positions of the benzothienyl nucleus to form a 2,3-dihydro-benzo[b]thieno [2,3-c]pyrrole nucleus and wherein U is selected from the group consisting of —$CH_2$—, —$CH_2.CH_2$— and —$OCH_2$— and $X^-$ is an anion and wherein $m$ is selected from 0,1 and 2 and R is a monovalent substituent selected from the class consisting of halogen, alkoxy of one to six carbon atoms, alkyl of one to six carbon atoms, alkoxycarbonyl of two to seven carbon atoms, and nitro.

The aforesaid alkoxy substituents may be methoxy, propoxy, ethoxy butoxy, amyloxy or hexyloxy. Alkyl radicals may be methyl, ethyl propyl, butyl, amyl or hexyl. Halogen substituents may be chlorine, bromine, fluorine or iodine, whilst halogenoalkyl substituents include 2-chloroethyl, 2-bromoethyl, 2-iodoethyl, 2-fluorethyl, 2-chloropropyl, 3-fluoropropyl, 4-trifluoromethylbutyl, 5-bromoamyl, 2-bromomethyl-3-bromopropyl, 3-methyl-5-iodopentyl and the like. Hydroxy alkyl substituents include 2-hydroxyethyl, 3-hydroxypropyl, 4-hydroxybutyl, 2-hydroxymethyl-3-hydroxypropyl, 4-hydroxybutyl, 2-hydroxymethyl-3-hydroxypropyl and the like. Cycloalkyl substituents may be cyclopropyl cyclobutyl, cyclopentyl or cyclohexyl. Alkoxycarbonyl substituents include methoxycarbonyl, ethoxycarbonyl, propoxycarbonyl, pentyloxy carbonyl and the like (methoxycarbonyl is the group —$CO.OCH_3$ often referred to as carboxymethyl).

Where throughout this specification reference is made to a substituent without reference to its isomeric state, the substituent includes all of its isomers. For example, reference to butyl includes n-butyl, iso-butyl, sec-butyl and tert-butyl. The term "benzothiophen" is used throughout this specification and the claims to mean the relevant compound itself and its acid addition salts and quaternary ammonium salts unless the context states or clearly implies otherwise.

One preferred class of compounds of the instant invention are those of the formula

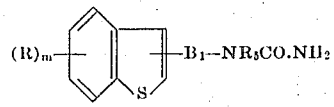

wherein $B_1$, is selected from the class consisting of —$CH_2$— and —$CH_2.CH_2$—, $R_5$ is selected from the class consisting of hydrogen and methyl, $m$ is selected from 0 and 1, and R is selected from the class consisting of chlorine, bromine, fluorine, iodine, methyl and methoxy, the R substituent being in a position selected from the 3 and 5 positions.

Another preferred class of compounds of the instant invention are those of the formula

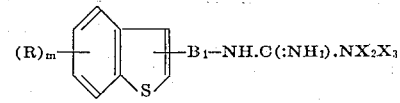

wherein $B_1$ is selected from the class consisting of —$CH_2$—and —$CH_2.CH_2$—, $X_1$ is selected from the class consisting of hydrogen and methyl, $X_2$ is selected from the class consisting of hydrogen and methyl, $X_3$ is selected from the class consisting of hydrogen, methyl, phenyl and the group —$C(:NH).NH_2$, $m$ is selected from 0 and 1, and R is selected from the class consisting of bromine, chlorine, methyl, and methoxy, the R substituted being in a position selected from the 3 and 5 positions.

Still another preferred class of compounds of the instant invention are those of the formula

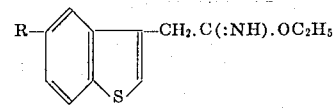

wherein R is selected from the class consisting of chlorine, bromine and methyl

Yet another preferred class of compounds of the instant invention are those of the formula

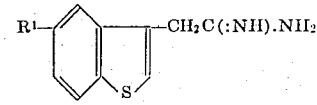

wherein $R^1$ is selected from the class consisting of hydrogen chlorine bromine and methyl.

Another preferred class of compounds of the instant invention are those of the formula

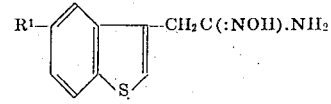

wherein $R^1$ is selected from the class consisting of hydrogen, chlorine, bromine and methyl.

Another preferred class of compounds of the instant invention are those of the formula

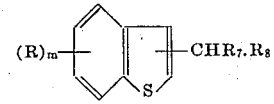

wherein $R_7$ is selected from the class consisting of hydrogen and methyl, $R_8$ is selected from the class consisting of amino, mono- and di-methyl-amino, pyrrolidino, piperidino and morpholino, $m$ is selected from 0,1 and 2 subject to the proviso that $m$ is an integer when $R_7$ is hydrogen and the group —$CH_2R_8$ is in a position selected from the 2 and 3 positions, and R is selected from the class consisting of chlorine, bromine, methyl, methoxy, ethoxycarbonyl and nitro, the R substituent being in a position selected from the 2, 3, 4, 5 and 7 positions.

Another preferred class of compound of the instant invention are those of the formula

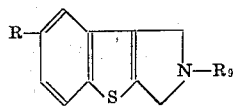

wherein $R_9$ is selected from the class consisting of alkyl of one to four carbon atoms, phenyl, benzyl and 2-hydroxyethyl and R is selected from the class consisting of chlorine and bromine. Preferred quaternary ammonium salts of these compounds are those of the formula

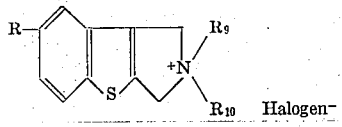

wherein $R_9$ and $R_{10}$ are independently selected from the class consisting of alkyl of one to four carbon atoms, phenyl, benzyl and 2-hydroxyethyl and R is selected from the class consisting of chlorine and bromine.

Another preferred class of compounds of the instant invention are those of the formula

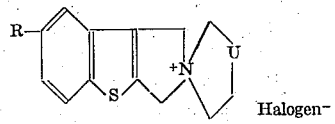

wherein U is selected from the class consisting of $-CH_2-$, $-CH_2CH_2-$ and $-OCH_2-$ and R is selected from the class consisting of chlorine and bromine.

Salts of the compounds of this invention are particularly acid addition salts, such as the pharmaceutically acceptable, nontoxic addition salts with suitable acids, such as those with inorganic acids, for example hydrochloric, hydrobromic, nitric, sulphuric or phosphoric acids, or with organic acids, such as organic carboxylic acids, for example glycollic, maleic, hydroxymaleic, malic, tartaric, citric, salicylic, o-acetyloxybenzoic, nicotinic or isonicotinic acid, or organic sulphonic acids for example, methane sulphonic, ethane sulphonic, 2-hydroxyethane sulphonic, toluene-p-sulphonic or naphthalene-2-sulphonic acid. Apart from pharmaceutically acceptable acid addition salts, other salts are also included within the scope of acid addition salts such as, for example, those with picric or oxalic acid; they may serve as intermediates in the purification of the compounds or in the preparation of other, for example, pharmaceutically accetable, acid addition salts, or are useful for identification, characterisation or purification of the bases.

A resulting acid addition salt may be converted into the free compound according to known methods, for example, by treating it with a base, such as with a metal hydroxide or alkoxide, for example, an alkali metal or alkaline earth metal hydroxide, for example, lithium hydroxide, sodium hydroxide, potassium hydroxide or calcium hydroxide; with a metal carbonate, such as an alkali metal or an alkaline earth metal carbonate or hydrogen carbonate, for example sodium, potassium or calcium carbonate or hydrogen carbonate; with ammonia; or with a hydroxyl ion exchange preparation, or with any other suitable reagent.

A resulting acid addition salt may also be converted into another acid addition salt according to known methods; for example, a salt with an inorganic acid may be treated with a metal salt, for example a sodium, barium or silver salt, of an acid in a suitable diluent, in which a resulting inorganic salt is insoluble and is thus removed from the reaction medium. An acid addition salt may also be converted into another acid addition salt by treatment with an anion exchange preparation.

Quaternary ammonium derivatives of the compounds of this invention are particularly those formed by reaction with lower alkyl (i.e., $C_1-C_6$) halides, for example, methyl, ethyl, or propyl chloride, bromide or iodide; di-lower alkyl sulphates, for example dimethyl or diethyl sulphate; lower alkyl lower alkane sulphonates, for example methyl or ethyl methane sulphonate or ethane sulphonate; lower alkyl aryl sulphonates, for example methyl or ethyl p-toluene sulphonates; and phenyl-lower alkyl halides, for example benzyl or phenethyl chloride, bromide or iodide. Also included are the quaternary ammonium hydroxides and the quaternary ammonium compounds having as anions those of other inorganic or organic acids, for example those of the acids used for the preparation of the previously mentioned acid addition salts.

The benzothiophens of the present invention possess useful pharmacological action, in particular antimicrobial action. Certain of the compounds also possess antihypertensive activity and this is most apparent in compounds wherein Y is a group of formula II(ii), II(iii) or II(v). By the term "antimicrobial," we mean to include antibacterial, antiviral, antifungal and anthelmintic actions, the compounds of the invention being particularly useful with regard to the first two of these actions, that is as antibacterials and/or antivirals.

In determining the antibacterial activity of the compounds of the invention, a solution or suspension was prepared by adding 0.1 ml. of ethanol to 20 mg. of the test compound and adding distilled water to a final volume of 10 ml. The resultant solution or suspension is mixed with an equivolume of double strength nutrient broth and a two fold dilution series in nutrient broth was then prepared. Aliquots from each dilution were innoculated with the test micro-organism and the inoculations wer incubated at 37° C for 24 hours. After incubation, the results were determined as growth or no growth of the test organism and the lowest concentration of test compound which totally inhibited the growth of the organism was recorded. Exemplary of the results obtained in this test with compounds of the present invention against particular organisms are 1-[2'-(5''-chloro-3''-benzo[b]-thienyl)ethyl] guanidine (<7.5µg./ml. against *staphylococcus aureus*, 62.5µg./ml. against *escherichia coli*), 1-[2'-(5''-methoxy-3''-benzo[b]thienyl)ethyl] guanidine (62.5µg./ml against *proteus vulgaris*), 5-bromo-3-benzo[b]thienylacetamidine (125µg./ml. against *escherichia coli*), 1-(5'-chloro-3'-benzo[b]thienyl methyl) guanidine (125 µg./ml. against *pseudomonas pyocyanea*), 1-(5'-chloro-3'-benzo[b]thienylmethyl) -3,3-dimethylguanidine (62.5µg./ml against *proteus vulgaris*),1-(5'-bromo-2'-benzo[b]thienyl methyl)guanidine (<0.35 µg./ml. against *staphylococcus aurcus* and 31/25µg./ml. against *pseudomonus pyocyanea*),1-(3'-methyl-5'-benzo [b]thienylmethyl)guanidine (125µg./ml. against *escherichia coli* and *proteus vulgaris*.

The antiviral activity was tested by an in vivo/invitro method using portions of chick chorioallantoic membrane maintained in Earles basal medium. The toxicity of the compound to this system is determined by pretreating tissue portions in various concentrations of test compound and then incubating the portions for 24 hours in the medium. Toxicity is judged on the basis of the inhibition of glucose metabolism, a non-toxic dose being that which does not cause greater than 10 percent reduction in glucose uptake. For activity studies, the tissue portions are pretreated with the highest non-toxic dose of test compound and subsequently washed with medium. The portions were then transferred to medium and inoculated with the appropriate virus suspension. After incubation for 24 hours, the medium was harvested and the reduction of infectious virus particles in the treated tissue was compared with the virus titre on untreated tissue. By this test, the compounds of the invention were found to be active against vaccinia and varicola viruses to an extent such that their use in smallpox prophylaxis and vaccinal complications in humans and animals is indicated. Thus, for example, 1-[2'-(5''-chloro-3''-benzo[b]thienyl)ethyl]guanidine and N-(5-chloro-2-benzo[b]thienyl methyl)morpholine have a degree of activity against vaccinia of the same order as that of methisazone (1-methylisatin-3-thiosemicarbazone) and accordingly the anti-viral drugs of the invention may be used in the same manner as that known effective drug.

In use the compounds of the invention will normally be formulated into pharmaceutical compositions of a type suitable for the desired mode of action. Such formulations are prepared in a manner well known in the pharmaceutical art and usually comprise the active compound or compounds in admixture or otherwise in association with a pharmaceutically acceptable carrier therefor. For internal use in animals including humans, the formulation will include tablets, capsules, powders, pastilles, suppositories, suspensions, injection solutions and the like. Such formulations will normally contain from about 1 to 500 mg. of active ingredient and will be administered in such a way as to provide the subject requiring antihypertensive or antimicrobial treatment with a dose of from 1 to 50 mg./kg. per day. For external use, the antimicrobial formulations may be applied to animate and inanimate situses in the form of creams, ointments, emulsions, solutions and the like, The amount of active ingredient may vary from 0.1 to 30 percent. A convenient form for marketing is a concentrated form containing 1 to 30 percent of active compound, which form can be diluted before use if desired but this is not necessary.

The present invention additionally provides processes by which the novel compounds of the invention may be prepared.

The compounds of the instant invention wherein Y is of the formula II (i) can be prepared by reaction of the corresponding amino compound with an alkali metal cyanate such as potassium cyanate, the reaction preferably being carried out at slightly elevated temperatures and in aqueous media.

The compounds of the instant invention wherein Y is of the formula II (i) except where $X_3$ is $-C(:NH)NH_2$ can be prepared by reaction of the corresponding amino compound with an S-methylthiuronium salt, such as a sulphate or halide, the reaction normally being carried out in a solvent such as ethanol and at elevated temperatures. Those compounds wherein y is of the formula II (ii) in which $X_3$ is $-C(:NH)NH_2$ can be prepared by reaction of the corresponding amino compound with a salt of dicyanimide, for example sodium or calcium dicyanamide, preferably in a solvent such as an alcohol (e.g. butanol) or water and normally at reflux temperatures, followed by reaction with an amine to produce the desired biguanide. Alternatively, the corresponding amino compound may be heated with dicyandiamide to produce the required biguanide group.

The compounds of the instant invention wherein Y is of the formula II(iii) can be obtained by reaction of the corresponding cyano compound with an alcohol of the formula $R_1OH$ wherein $R_1$ is as defined previously, the reaction preferably being carried out in a solvent or mixture of solvents such as benzene or dioxan.

The compounds of the instant invention wherein Y is of the formula II (iv) can be obtained by reaction of the corresponding compound of the instant invention wherein Y is of the formula II(iii) with ammonia in the presence of a suitable solvent such as an alcohol (e.g. ethanol).

The compounds of the instant invention wherein Y is of the formula II (v) can be obtained by reaction of the corresponding cyano compound with a hydroxylamine in the presence of a solvent such as water or aqueous ethanol, the reaction normally being carried out at elevated temperatures.

The compounds of the instant invention wherein Z is of the formula $-CH_2R_8$ wherein $R_8$ is as defined above can be obtained by reducing the corresponding cyano compound or corresponding amido compound using a reducing agent such as lithium aluminium hydride and aluminium chloride in a suitable solvent such as ether. They can be obtained also by reaction of the corresponding halogenomethyl compound with the required amine, the reaction being carried out in a solvent or mixture of solvents such as benzene or ether. The latter process can be employed to obtain compounds of the instant invention wherein Z is of the formula $$-\overset{CH_3}{\underset{}{CHR_8}}$$

by using the appropriate 1-halogenoethyl benzothiophen as starting material.

The compounds of the instant invention which have a 2,3-dihydro-benzo[b]thieno[2,3-c]pyrrole nucleus can be obtained by reacting the corresponding 2,3-dihalogenomethyl benzothiophen with a primary or secondary amine, preferably in a suitable solvent such as benzene or dioxan and preferably at elevated temperatures, normally at reflux temperature. In the case where an alkanolamine is used, the N-hydroxyalkyl compound produced can be converted to the corresponding N-halogenoalkyl compound by reaction with a halogenating agent such as thionyl chloride, phosphorus tribromide or tri-iodide in the presence or absence of an inert solvent such as chloroform.

The following examples illustrate the invention:

EXAMPLE 1

N-[2'-(5''-chloro-3''-benzo[b]thienyl)ethyl]urea

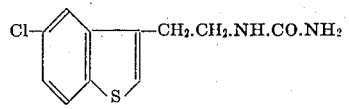

Powdered potassium cyanate (2.5 g.) was slowly added with shaking to a warmed solution of 2-(5'-chloro-3'-benzo[b]thienyl) ethylamine hydrochloride (4g.) in water (80ml). The mixture was kept at 0°C. overnight, and the resultant solid collected washed with water and dried. Crystallisation from ethanol yielded the desired compound, m.p. 195°–196° C.

By a similar method, the following compounds were prepared from the corresponding ethylamines or methylamines:

N-(5-chloro-3-benzo[b]thienylmethyl) urea, m.p. 204°–5° C.
N-(3-benzo[b]thienylmethyl) urea, m.p. 194°–5° C.
N-(5-chloro-2-benzo[b]thienylmethyl) urea, m.p. 194°–5° C.
N-[2'-(5''-chloro-2''-benzo[b]thienyl)ethyl] urea, m.p. 144°–5° C.
N-[2'(5''-bromo-2''-benzo[b]thienyl)ethyl] urea, m.p. 140°–1° C.
N-(5-bromo-2-benzo[b]thienylmethyl) urea, m.p. 189°–90° C.
N-[2'-(3''-benzo[b]thienyl)ethyl] urea, m.p. 172°–3° C.
N-(3-methyl-5-benzo[b]thienylmethyl) urea, m.p. 199°–200° C.
N-[2'-(5''-methoxy-3''-benzo[b]thienyl)ethyl] urea, m.p. 185°–6° C.
N-[2'-(5''-methoxy-2''benzo[b]thienyl)ethyl] urea, m.p. 168°–70° C.
N-(5-bromo- 3-benzo[b]thienylmethyl)urea, m.p. 211°–3° C.
N-(5-fluoro-2-benzo[b]thienylmethyl) urea, m.p. 191°–2° C.
N-(5-fluoro-2-benzo[b]thienylmethyl)-N-methylurea, m.p. 164°–6° C.
N-(5-iodo-2-benzo[b]thienylmethyl) urea, m.p. 281°–3° C.
N-(5-methyl-2-benzo[b]thienylmethyl) urea, m.p. 206°–8° C.

EXAMPLE 2

1-(5'-chloro-3'-benzo[b]thienylmethyl)guanidine

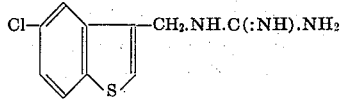

S-Methylthiouronium iodide (4.35g) was added with shaking to 5-chloro-3-benzo[b]thienylmethylamine dissolved in ethanol (14 ml.). The clear solution was boiled under reflux until the smell of methyl thiol disappeared. The methyl thiol produced by the reaction was removed from the apparatus by a stream of dry nitrogen which then passed through two traps containing an aqueous solution of lead acetate and mercuric chloride respectively. The ethanol was removed under reduced pressure and left an oil which gave the required guanidine as its hydriodide upon trituration with dry ether. The salt was filtered off, washed with dry ether and crystallised from ethanol/ether to give 1-(5'-chloro-3'-benzo[b]thienylmethyl) guanidine hydriodide m.p. 182°–3° C.

The hydriodide (3g) in absolute ethanol (100 ml) was passed down a column of Amberlite IRA 401 resin (chloride form) and the column was washed with absolute ethanol. Evaporation of the ethanolic solution of the resulting hydrochloride, followed by crystallisation from ethanol/ether yielded 1-(5'-chloro-3'benzo[b]-thienylmethyl) guanidine hydrochloride, m.p. 174°–175° c. Alternatively the hydrochloride may be obtained by using S-methylthiouronium chloride in the original reaction.

By similar methods the following compounds were prepared:

1-(3'-benzo[b]thienylmethyl)guanidine hydriodide, m.p 156°–7° C.
1-(3'-benzo[b]thienylmethyl)guanidine hydrochloride, m.p. 184°–5° C.
1-[2'-(3''-benzo[b]thienyl)ethyl]guanidine hydriodide, m.p. 155°–6° C.
1-[2'-(3''-benzo[b]thienyl)ethyl]guanidine hydrochloride, m.p. 191°–2° C.
1-[2'-(5''-chloro-3''benzo[b]thienyl)ethyl]guanidine hydriodide, m.p. 151°–2° C.
1-(5'-chloro-2'-benzo[b]thienylmethyl)guanidine hydriodide, m.p. 195°–6° C.
1-(5'-bromo-2'-benzo[b]thienylmethyl)guanidine hydriodide, m.p. 210°–1° C.
1-(5'-bromo-3'-benzo[b]thienylmethyl)guanidine hydrochloride, m.p. 211°–3° C.
1-(5'-chloro-3'-benzo[b]thienylmethyl)-3-methylguanidine hydrochloride, m.p. 200° –1° C.
1-(5'-chloro-3'-benzo[b]thienylmethyl)-3-phenylguanidine hydrochloride, m.p. 165°–6° C.
1-(5'-chloro-3'-benzo[b]thienylmethyl)-2,3-dimethylguanidine hydrochloride, m.p. 180°–1° C.

1-(5'chloro-3'-benzo[b]thienylmethyl)-3,3-dimethylguanidine hydrochloride m.p. 238°–9° C.

1-[2'-(5''-chloro-3''-benzo[b]thienyl)ethyl]-3-methylguanidine hydrochloride 139°–40° C.
1-(3'-methyl-5'-benzo[b]thienylmethyl)guanidine hydriodide, m.p. 186°–7° C.
1-[2'-(5''-methoxy-3''-benzo[b]thienyl)ethyl]guanidine hydriodide, m.p. 177°–9° C.
1-[2'-(5''-chloro-3''-benzo[b]thienyl)ethyl]-3-phenylguanidine hydrochloride, m.p. 164°–5° C.
1-[2'-(5''-chloro-3''-benzo[b]thienyl)ethyl]-2,3-dimethylguanidine hydrochloride, m.p. 230°–1° C.
1-[2'-(5''-chloro-3''-benzo[b]thienyl)ethyl]-3,3-dimethylguanidine hydrochloride, m.p. 217°–8° C.

1-(5'-bromo-3'-benzo[b]thienylmethyl]-3-methylguanidine hydrochloride, m.p. 221°–2° C.
1-(5'-bromo-3'-benzo[b]thienylmethyl)-3-phenylguanidine hydrochloride, m.p. 160°–4° C.

EXAMPLE 3

5-methyl-3-benzo[b]thienylmethylamidoxime

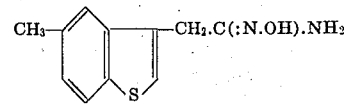

5-methyl-3-cyanomethylbenzo[b]thiophen (0.014 mole) was heated on a steam bath for 90 minutes with a solution of anhydrous sodium carbonate (2.5g) and hydroxylamine hydrochloride (3.5g) in water (38 ml), sufficient ethanol being added to keep the solution clear. A little ethanol was removed and the product crystallised from the cooled solution. On recrystallisation from ethanol, the required amidoxime, m.p. 110°-2° C., was obtained.

By a similar method, the following compounds were prepared:

3-benzo[b]thienylmethylamidoxime, m.p. 128°-9° C.
5-chloro-3-benzo[b]thienylmethylamidoxime, m.p. 160°-1° C.
5-bromo-3-benzo[b]thienylmethylamidoxime, m.p. 185°-6° c.

EXAMPLE 4

Ethyl 5-chloro-3-benzo [b]thienylacetimidate

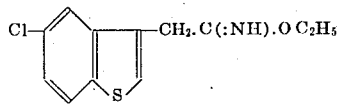

5-chloro-3-cyanomethylbenzo[b]thiophen (0.02 mole) and dry ethanol (1.0g., 0.021 mole) were dissolved in a mixture of dry benzene (20–40 ml) and just sufficient pure dioxan to prevent precipitation at 0° C. The solution was saturated with dry hydrogen chloride at 0° C. and was kept in the refrigerator overnight. The crystals which precipitated were filtered off, washed with dry ether and dried in vacuo to yield the desired acetimidate as its hydrochloride, m.p. 206-8°C. (decomp.). Similarly the following compounds were prepared:

ethyl 5-methyl-3-benzo[b]thienylacetimidate hydrochloride, m.p. 105°-7° C. (decomp.)
ethyl 5-bromo-3-benzo[b]thienylacetimidate hydrochloride, m.p. 230°-2° C. (decomp.)

EXAMPLE 5

5-bromo-3-benzo[b]thienylacetamidine

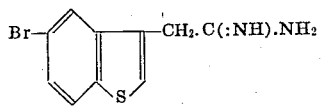

Ethyl 5-bromo-3-benzo[b]thienylacetimidate hydrochloride (3g) was added in small portions with shaking to an ice-cold saturated solution of ammonia in absolute ethanol (40 ml). Shaking was continued with occasional cooling in ice-water until all the solid had dissolved. The clear solution was left in the refrigerator overnight and then reduced in volume to approximately 20 ml. Dry ether was added and the mixture was allowed to stand in the refrigerator for several hours. The resultant white solid was collected, washed with dry ether, air-dried and crystallised from ethanol to give the desired acetamidine as its hydrochloride, m.p. 322°-3° C. Similarly the following compounds were prepared: 3-benzo[b]thienyl acetamidine hydrochloride, m.p. 166°-7° C. 5-methyl-3-benzo[b]thienylacetamidine hydrochloride, m.p. 256°-7° C. 5-chloro-3-benzo[b]thienylacetamidine hydrochloride, m.p. 303°-4° C.

EXAMPLE 6

7bromo-2,3-dihydro-2,2-tetramethylene-1H[1]benzo[b]thieno [2,3-c]pyrrolium bromide

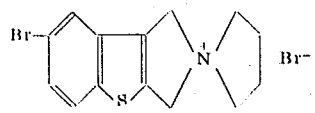

5-bromo-2,3-bis-bromomethylbenzo[b]thiophen (0.04 mole) and pyrrolidine hydrobromide (0.5 mole) were refluxed in benzene for 2 hours and then the mixture was allowed to stand at room temperature for 24 hours. The reaction mixture was filtered and the benzene solution concentrated to give the required product which was recrystallised from aqueous ethanol, m.p. 255°-6° C.

EXAMPLE 7

7-chloro-2-(2'-hydroxyethyl)-2,3-dihydro-1H[1]benzo[b]thieno [2,3-c]pyrrole hydrochloride and the corresponding 2'-chloroethyl derivative

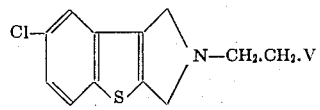

V=OH or Cl 5-chloro-2,3-bis-bromomethylbenzo[b]thiophen (0.04 mole) and ethanolamine hydrochloride (0.4 mole) were heated in dry dioxan for 2 hours at 100° C. The solution was poured into water and the product shaken with ether. The ethereal solution was dried and addition of dry hydrogen chloride gave a precipitate which was crystallised from aqueous butanol to give the desired 2'-hydroxyethyl compound as its hydrochloride, m.p. 232°-3° C. This hydrochloride (0.5g) was boiled under reflux with thionyl chloride (10 ml) in dry chloroform (50 ml) for 20 hours. All volatile material was removed under vacuum at 15 mm/Hg and the residue was recrystallised from ethanol/ether to give the pure 2'-chloroethyl compound as its hydrochloride, m.p. 217°-9° C.

Using the appropriate primary or secondary amines and with procedures as described above or as described in Example 6, the following compounds were prepared:

7-bromo-2-t.butyl-2,3-dihydro-1H[1]benzo[b]-thieno[2,3-c]pyrrole hydrochloride, m.p. 248°-9° C.
7-chloro-2-cyclohexyl-2,3-dihydro-1H[1]benzo[b]-thieno[2,3-c]pyrrole hydrochloride, m.p. 254°-5° C.
7-bromo-2-benzyl-2,3-dihydro-1H[1]benzo[b]-thieno[2,3-c]pyrrole hydrobromide, m.p. 234° C.
7-chloro-2,2-dimethyl-2,3-dihydro-1H[1]benzo[b]-thieno[2,3-c]*pyrrolium bromide, m.p.* 225°-6° C.
7-bromo-2,2-dimethyl-2,3-dihydro-1H[1]benzo[b]-thieno[2,3-c]*pyrrolium bromide, m.p.* 229°-230° C.

7-chloro-2,2-diethyl-2,3-dihydro-1H[1]benzo[b]-thieno[2,3-c]pyrrolium bromide, m.p. 207°-8° C.
7-bromo-2,2-diethyl-2,3-diethyl-2,3-dihydro-1H[1]benzo[b]thieno[2,3-c]pyrrolium bromide, m.p. 215°-6° C.
7-chloro-2,2-dibenzyl-2,3-dihydro-1H[1]benzo[b]-thieno[2,3-c]pyrrolium bromide, m.p. 180°-4° C.
7-bromo-2,2-dibenzyl-2,3-dihydro-1H[1]benzo[b]-thieno[2,3-c]pyrrolium bromide, m.p. 174°-5° C.
7-chloro-2,2-tetramethylene-2,3-dihydro-1H[1]benzo[b]thieno[2,3-c]pyrrolium bromide, m.p. 256°-7° C.
7-chloro-2,2-pentamethylene-2,3-dihydro-1H[1]benzo[b]thieno[2,3-c]*pyrrolium bromide, m.p.* 250°-1° C.

7-bromo-2,2-pentamethylene-2,3-dihydro-1H[1]benzo[b]thieno[2,3-c]pyrrolium bromide, m.p. 244°–5° C.

7-chloro-2,2-anhydrobis(2'-hydroxyethyl)-2,3-dihydro-1H[1]benzo[b]thieno[2,3-c]pyrrolium bromide, m.p. 220°–1° C.

7-bromo-2,2-anhydrobis(2'-hydroxyethyl)-2,3-dihydro-1H[1]benzo[b]thieno[2,3-c]pyrrolium bromide, m.p. 217°–8° C.

7-chloro-2-methyl-2-(2'hydroxyethyl)-2,3-dihydro-1H[1]benzo[b]thieno [2,3-c]pyrrolium bromide, m.p. 209°–10° C.

7-bromo-2-methyl-2-(2'hydroxyethyl)-2,3-dihydro-1H[1]benzo[b]thieno [2,3-c]pyrrolium bromide, m.p. 208°–9° C.

7-chloro-2-ethyl-2-(2'-hydroxyethyl)-2,3-dihydro-1H[1]benzo[b]thieno [2,3-c]pyrrolium bromide, m.p. 203°–4° C 7-bromo-2-ethyl-2-(2'-hydroxyethyl)-2,3-dihydro-1H[1]benzo[b]thieno [2,3-c]pyrrolium bromide, m.p. 198°–9° C 7-chloro-2-benzyl-2-(2'-hydroxyethyl)-2,3-dihydro-1H[1]benzo[b]thieno [2,3-c]pyrrolium bromide, m.p. 147°–8° C.

EXAMPLE 8

1-(5'-chloro-3'-benzo[b]thienylmethyl)biguanide

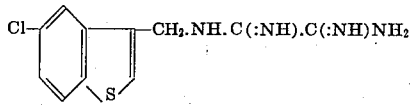

An intimiate mixture of 3-aminomethyl-5-chlorobenzo[b]thiophen hydrochloride (0.02 mole, 4.68 g.) and dicyandiamide (0.02 mole, 1.68 g.) was heated in an oil bath at 150°–180° C. for 6 hours. The mixture melted at 173° C. The reaction mixture was cooled and the product extracted with dry ethanol (150 ml.). The extract was cooled and filtered and then concentrated to about 15–20 ml. The addition of dry ether precipitated the product as a gum which slowly solidified. It was recrystallized ffom dry ethanol/ether to yield the required biguanide as its hydrochloride, m.p. 229°–30° C.

Example 9

5-chloro-2-morpholinomethylbenzo[b]thiophen

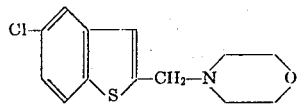

5-chloro-2-chloromethylbenzo[b]thiophen (0.050 mole) was dissolved in dry benzene (300 ml.) and morpholine (0.10 mole) was added. The solution was stood at room temperature for 30 minutes and then boiled for 30 minutes. Ether (300 ml.) was added and the mixture was washed with water. The solution was dried (Na$_2$SO$_4$) and distillation under reduced pressure gave the desired product as an oil. Addition of a dry ethereal solution of the product to dry ethereal hydrogen chloride produced the corresponding hydrochloride, m.p. 239°–40°C. after recrystallisation from dry ethanol.

Similarly, the following compounds were prepared:
5-chloro-2-pyrrolidinomethylbenzo[b]thiophen hydrochloride, m.p.202°–3° C.
5-chloro-2-piperidinomethylbenzo[b]thiophen hydrochloride, m.p. 218°–9° C.
5-bromo-2-piperidinomethylbenzo[b]thiophen hydrochloride, m.p. 203°–4° C.
5-bromo-2-morpholinomethylbenzo[b]thiophen hydrochloride, m.p. 246°–7° C.
5-bromo-2-pyrrolidinomethylbenzo[b]thiophen hydrochloride, m.p. 208°–9° C.

EXAMPLE 10

3-(1'-chloroethyl[benzo[b]thiophen]) (0.050 mole) was dissolved in dry benzene (300 ml) and dimethylamine (0.10 mole) was added. The solution was stood at room temperature for 30 minutes and then boiled for 30 minutes. Ether (300 ml) was added and the mixture washed with water. The solution was dried (Na$_2$SO$_4$) and distilled under reduced pressure. Addition of a dry etheral solution of the distillate to dry ethereal hydrogen chloride produced N, N-dimethyl-1-(3-benzo[b]thienyl)ethylamine hydrochloride, m.p. 180°–1° C after recrystallisation from dry ethanol.

EXAMPLE 11

To slurry of lithium aluminium hydride (0.025 mole) in dry ether (25 ml) was added a solution of aluminium chloride (0.025 mole) in dry ether (50 ml) under nitrogen with stirring. After 3 minutes, 3-methyl-5-cyanobenzo[b]thiophen (0.025 mole) dispersed in dry ether (150 ml) was slowly added and the mixture refluxed for 22 hours. Any excess off reducing agent was then destroyed by addition of water and the mixture basified with sodium hydroxide. The ethereal layer was separated and the aqueous layer shaken with more ether. The combined ethereal layers were washed with water, dried MgSO4) and the product precipitated as its hydrochloride by addition of ethereal hydrogen chloride. Recrystallisation from dry ethanol yielded 3-methyl-5-aminomethylbenzo[b]thiophen hydrochloride, m.p. 254°–6° C.

EXAMPLE 12

The method of Example 10 was repeated using the appropriate ethyl 4 and/or 5-bromo-3-bromomethyl benzo[b]thiophen-2-carboxylate instead of 3-(1'-chloroethyl)benzo[b]thiophen and using morpholine or pyrrolidine as appropriate instead of dimethylamine to prepare the following compounds:
ethyl-4-bromo-3-morpholinomethylbenzo[b]thiophen-2-carboxylate hydrochloride, m.p. 205°–6° C
ethyl 5-bromo-3-morpholinomethylbenzo[b]thiophen-2-carboxylate hydrochloride, m.p. 225°–6° C
ethyl-4-bromo-3-pyrrolidinomethylbenzo[b]thiophen-2-carboxylate hydrochloride, m.p. 148°–9° C
ethyl-4,5-dibromo-3-pyrrolidinomethylbenzo[b]thiophen-2-carboxylate hydrochloride, m.p. 202°–3° C

EXAMPLE 13

A mixture of 3-bromomethyl-7-chlorobenzo[b]thiophen (2.74 g. 0.0105 mole) and morpholine (1.83 g. 0.021 mole) in dry benzene (60 ml) was heated under reflux for 30 minutes and dry ether (60 ml) was added. The mixture was washed several times with water to remove secondary amine hydrobromide. The ether-benzene layer was dried (MgSO4) and, 7-chloro-3-morpholinomethylbenzo[b]thiophen was precipitated as its hydrochloride by the addition of ethereal hydrogen chloride. The product was recrystallised from ethanol and had m.p. 213°–214° C. Yield 75 percent

EXAMPLE 14

The method of Example 10 was repeated using the appropriate substituted bromo (or chloro) methyl benzo[b]thiophen instead of 3-(1'-chloroethyl)benzo[b]thiophen and using the appropriate amine instead of dimethylamine to prepare the following compounds:

3-methyl-5-pyrrolidinomethylbenzo[b]thiophen hydrochloride, m.p. 239°–40° C 3-methyl-5-piperidinomethylbenzo[b]thiophen hydrochloride, m.p. 228°–30° C 3-methyl-5-morpholinomethylbenzo[b]thiophen hydrochloride, m.p. 242°–4° C 2,3-dimethyl-5-pyrrolidinomethylbenzo[b]thiophen hydrochloride m.p. 245°–7° C 2,3-dimethyl-5-morpholinomethylbenzo[b]thiophen hydrochloride m.p. 257°–8° C 2,3-dimethyl-5-piperidinomethylbenzo[b]thiophen hydrochloride m.p. 267°–9° C N-methyl-2-aminomethyl-4-bromobenzo[b]thiophen hydrochloride 2-piperidinomethyl-3-bromobenzo[b]thiophen hydrochloride, m.p. 242°–4° C 2-morpholinomethyl-3-bromobenzo[b]thiophen hydrochloride m.p. 218°–20° C 2-bromo-3-pyrrolidinomethyl-5-nitrobenzo[b]thiophen hydrochloride m.p. 261°–2° C 2-bromo-3-morpholinomethyl-5-nitrobenzo[b]thiophen hydrochloride m.p. 271°–2° C 2-bromo-3-piperidinomethyl-5-nitrobenzo[b]thiophen hydrochloride m.p. 258°–9° C 7-chloro-3-piperidinomethylbenzo[b]thiophen hydrochloride m.p. 247°–8° C 7-chloro-3-pyrrolidinomethylbenzo[b]thiophen hydrochloride m.p. 225°–6° C 5-bromo-3-morpholinomethylbenzo[b]thiophen hydrochloride 5-chloro-2-N,N-dimethyl-aminomethylbenzo[b]thiophen hydrochloride 5-methoxy-2-pyrrolidinomethylbenzo[b]thiophen hydrochloride 2-bromo-3-piperidinomethylbenzo[b]thiophen hydrochloride m.p. 229°–30° C 2-bromo-3-morpholinomethylbenzo[b]thiophen hydrochloride m.p. 224°–5° C

EXAMPLE 15

The method of Example 11 was repeated using the appropriate substituted cyanobenzo[b]thiophen instead of 3-methyl-5-cyanobenzo[b]thiophen to prepare the following compounds:

2,3-dimethyl-5-aminomethylbenzo[b]thiophen hydrochloride, m.p. 284020 –7° C 284°

2-aminomethyl-3-bromobenzo[b]thiophen hydrochloride m.p. 285° C 7-chloro-3-aminomethylbenzo[b]thiophen hydrochloride m.p. 260° C (dec.)

2-bromo-3-aminomethylbenzo[b]thiophen hydrochloride m.p. 302°–4° C

In the following examples of pharmaceutical compositions, the term "medicament" is used to indicate 1-(5'-chloro-3'-benzo[b] thienylethyl) guanidine. This compound may of course be replaced in these compositions by any other compound of the invention of similar activity. Adjustments in the amount of medicament may be necessary or desirable as is well known in the art depending on the degree of activity of the medicament used.

EXAMPLE 16

Tablets were made as follows:

| | |
|---|---|
| Medicament | 200.0 mg. |
| Lactose | 247.5 mg. |
| Maize starch (1) | 20.0 mg. |
| Maize starch as a 1 in 10 paste with water (ii) | 20.0 mg. |
| Maize starch (iii) | 10.0 mg. |
| Magnesium stearate | 2.5 mg. |

The lactose and starch (i) were passed through a 44 mesh B.S.S. screen and mixed thoroughly. The starch paste (ii) was used to granulate the mixture and the granules were passed through a 12 mesh screen. The granules were then dried at 40° C and passed through a 16 mesh B.S.S. screen. The starch (iii) and the magnesium stearate were passed through a 60 mesh B.S.S. screen added to the granules and mixed thoroughly. The resultant granules were then compressed into tablets. Such tablets are useful for administration to humans suffering hypotension, dosages being 1 or 2 tablets taken 2 to 3 times per day.

EXAMPLE 17

Capsules were made as follows:

| | |
|---|---|
| Medicament | 500 mg. |
| Lactose | 98 mg. |
| Magnesium stearate | 2 mg. |

The medicament, lactose and magnesium stearate were passed through a No. 44 mesh B.S.S. sieve and filled into hard gelatin capsules. Such capsules are useful for the treatment of persons who have contacted smallpox patients as well as those in whom there is a suspicion as to the early stages of smallpox infection. They can be used also to treat persons suffering from complications following smallpox vaccination. Depending on the treatment required dosages may be from two to four capsules in the morning and evening.

EXAMPLE 18

An ointment containing 5 percent medicament was prepared as follows:

| | |
|---|---|
| Medicament | 5.0 g. |
| Liquid paraffin | 5.0 g. |
| White soft paraffin | 90.0 g. |

The white soft paraffin and liquid paraffin were melted together using gentle heat and the medicament, previously passed through a 60 mesh B.S.S. screen was suspended in the melt. The mixture was stirred until cold to form an ointment useful for the treatment of fungal or bacterial injections of the skin.

EXAMPLE 19

Suppositories were prepared as follows:

| Medicament | 20 g. |
| --- | --- |
| Oil of theobroma | 80 g. |

The medicament was passed through a 60 mesh B.S.S. screen and suspended in the theobroma oil previously melted using the minimum amount of heat necessary. The mixture was then poured into suppository moulds of a nominal capacity of 1 g. or 2 g. as desired to produce suppositories each containing 200 mg. or 400 mg. of medicament.

Having regard to the foregoing disclosure, the following is claimed as the inventive and patentable embodiments thereof:

1. A benzo[b] thiophen having the formula:

$(R)_m$―[benzothiophene]―$(B)_n$―NH―C(=NX$_1$)―NX$_2$X$_3$ wherein
   $X_1$ is selected from the group consisting of hydrogen and alkyl having from one to six carbon atoms;
   $X_2$ is selected from the group consisting of hydrogen and alkyl having from one to six carbon atoms;
   $X_3$ is selected from the group consisting of hydrogen and alkyl having from one to six carbon atoms, phenyl and the group ―C(:NH).NH$_2$;
   R is selected from the group consisting of halogen, alkyl having from one to six carbon atoms, and alkoxy having from one to six carbon atoms attached to the 3- or 5 -positions of the benzothienyl nucleus;
   B is an alkylene chain having from one to four carbon atoms attached to the 2-, 3-, or 5-positions of the benzothienyl nucleus;
   n is zero or one; and
   m is 0, 1, or 2;
or an acid addition salt or quaternary ammonium salt thereof.

2. A benzothiophen as claimed in claim 1 of the formula $(R)_m$―[benzothiophene]―$B_1$―NH.C(:NX$_1$).NX$_2$X$_3$ wherein $B_1$ is selected from the class consisting of ―CH$_2$― and ―CH$_2$.CH$_2$―, $X_1$ is selected from the class consisting of hydrogen and methyl, $X_2$ is selected from the class consisting of hydrogen and methyl, $X_3$ is selected from the class consisting of hydrogen, methyl, phenyl, and the group ―C(:NH).NH$_2$, m is selected from 0 and 1, and R is selected from the class consisting of bromine, chlorine, methyl, and methoxy.

3. A benzo [b] thiophen in accordance with claim 1 having the structure 1-(5'-chloro-3'-benzo [b] thienylmethyl) guanidine hydroiodide.

4. A benzo [b] thiophen in accordance with claim 1 having the structure 1-(3'-methyl-5'-benzo[b] thienylmethyl)guanidine hydroiodide.

5. A benzo [b] thiophen in accordance with claim 1 having the structure 1-[2'-(5''-chloro-3''-benzo[b] thienyl(ethyl) -2,3-dimethylguanidine hydrochloride.

6. A benzo [b] thiophen in accordance with claim 1 having the structure 1-(5'-chloro-3'-benzo[b] thienylmethyl)biguanidine hydrochloride.

7. A benzo [b] thiophen in accordance with claim 1 having the structure 1-[2'-(5''-chloro-3''-benzo[b] thienyl)ethyl]-3-phenylguanidine hydrochloride.

8. A benzo [b] thiophen in accordance with claim 1 having the structure 1-[2'-(5''-chloro-3''-benzo [b] thienyl-ethyl]-3-methylguanidine hydrochloride.

* * * * *

UNITED STATES PATENT OFFICE
CERTIFICATE OF CORRECTION

Patent No. 3,855,242  Dated December 17, 1974

Inventor(s) Norman Bellamy Chapman et al

It is certified that error appears in the above-identified patent and that said Letters Patent are hereby corrected as shown below:

line 24, "O" should be —O—; line 43, "IIV" should be —-(IIv)—:

Column 3, line 31, after "ethoxy", please insert —,—.

Column 4, lines 18-19, "substituted" should be —substituent—.

Column 6, line 44, "wer" should be —were—; lines 56-57, "escherichia coli" should be in italics; line 62, "aurcus" should be —aureus—; line 63, "31/25" should be —31.25—.

Column 7, line 1, "Earles" should be —Eagles—.

Column 11, line 9, "c." should be —C.—.

Column 13, line 34, "intimiate" should be —intimate—.

Column 14, line 18, "etheral" should be —ethereal—; line 31, "off" should be —of—

Column 15, line 3, "MgSO4" should be —$MgSO_4$—; line 53, after "hydrochloride" and before "2-bromo-3-piperidinomethylbenzo...229°-30°C", please insert —7-chloro-3-morpholinomethylbenzo[b] thiophen hydrochloride m.p. 213-4°C.— and immediately following, but on the next line, please insert —2-bromo-3-pyrrolidinomethylbenzo[b] thiophen hydrochloride m.p. 207°-9°C.—; line 66, "284020-7°C 284°C" should Patent No. 3,855,242, Dated December 17, 1974, Norman Bellamy Chapman et al.

be --284°-7°C--.

Column 18, line 33, claim 6, "biguanidine" should be --biguanide--.

Signed and Sealed this thirtieth Day of March 1976

[SEAL]

Attest:

RUTH C. MASON
Attesting Officer

C. MARSHALL DANN
Commissioner of Patents and Trademarks